3,172,750
EMULSIFIABLE TOXICANT CONCENTRATE
Siegfried Altscher, Union, and Thomas F. Groll, Jr., Elizabeth, N.J., assignors to Nopco Chemical Company, Newark, N.J., a corporation of New Jersey
No Drawing. Original application Nov. 18, 1957, Ser. No. 696,969, now Patent No. 3,071,550, dated Jan. 1, 1963. Divided and this application Dec. 26, 1961, Ser. No. 163,958
10 Claims. (Cl. 71—2.3)

The present invention relates to toxicant emulsions for agricultural and livestock purposes. More particularly, this invention relates to emulsifier compositions and toxicant concentrates containing same which, when diluted with water, readily form stable emulsions of effective toxicity.

In the past several years, numerous new synthetic organic toxicants have been developed for agricultural and livestock purposes, for example as insecticides, herbicides, fungicides, rodenticides, and weed killers. These toxicants are characterized by being insoluble in water and moderately to easily soluble in organic solvents. Among these new toxicants are the following: DDT (dichlorodiphenyl-trichloroethane), benzene hexachloride, hexamethyl tetraphosphate, benzyl benzoate, dimethyl phthalate, parathion (o,o-diethyl-p-nitrophenylthiophosphate), tetraethyl pyrophosphate, malathion (o,o-dimethyl-dithiophosphate of diethyl mercaptosuccinate), 2,4-D (2,4-dichloro-phenoxyacetic acid), methoxychlor (dimethoxy-diphenyl-trichloroethane), alpha-naphthyl thiourea, aldrin (1,2,3,4,10,10 - hexachloro - 1,4,4a,5,8,8a-hexahydro-1,4-endo, exo-5,8-dimethanonaphthalene), dialdrin (1,2,3,4,-10,10 - hexachloro-6,7-epoxy,1,4,4a,5,6,7,8,8a-octahydro-1,4-endo, exo-5,8-dimethanonaphthalene), lindane (gamma isomer of benzenehexachloride), toxaphene (a chlorinated camphene with approximate formula $C_{10}H_{10}Cl_8$, containing about 67–69% by weight of chlorine), chlordane (1,2,4,5,6,6,8,8-octa-chloro-4,7-methano-3a,4,7,7a-tetrahydroindane), and the like. Such toxicants are conventionally admixed with emulsifying agents and organic solvents to form concentrates which are subsequently added to water in small quantities to form emulsions. These emulsions are sprayed or otherwise applied to the surface of the plants, weeds, animals or insects to be treated.

Numerous types of emulsifying agents have been suggested and employed for the above purposes. One large group comprises nonionic materials such as polyoxyalkylene ethers of alkyl phenols e.g., polyoxyethylene ethers of di-isobutyl phenol; partial esters of rosin acids and higher molecular weight fatty acids with hexitol anhydrides e.g., sorbitan monooleate, sorbitan trioleate; polyoxyethylene derivatives of hexitol anhydrides partially esterified with higher molecular weight fatty acids, such as polyoxyethylene sorbitan monooleate, polyoxyethylene sorbitan monostearate, and the like. Another group of emulsifiers comprises anionic materials such as the following sulfonates: sodium alkylnaphthalene sulfonates, sodium tetrahydronaphthalene sulfonate, sodium salts of aryl alkyl polyether sulfonates, sodium salts of alkylated benzene sulfonates, and the like. Also, nonionic emulsifiers have combined with certain anionic materials. These emulsifiers have been found to be useful in particular compositions and under particular conditions. However, these emulsifiers have a number of disadvantages with which the art is acquainted. The prime difficulty is that these newer toxicants are water-insoluble although fairly soluble in the common petroleum solvents. Hence, it has been a continuing problem in the art to devise new and improved emulsifier systems for dispersing these toxicants in water.

Accordingly, it is an object of the present invention to provide for a novel emulsifier system which brings about the successful formulation of stable toxicant concentrates.

It is a further object to provide for a novel emulsifier system from which the resulting toxicant concentrate may be diluted with water to form stable emulsions for application to foliage, livestock, etc.

Other objects will become apparent from the detailed description given herein. It is intended however, that the detailed description and specific examples do not limit the invention, but merely indicate preferred embodiments thereof since various changes and modifications within the scope of the invention will become apparent to those skilled in the art.

We have discovered that the above and other objects may be achieved by a novel emulsifier system containing an anionic component and a novel nonionic component in admixture with each other.

The anionic emulsifier component is selected from a known class of compounds and may be represented by the following formula $[R—Ar—SO_3]_xM$ wherein R represents an alkyl group having from 8 to 18 carbon atoms in the chain, Ar is a phenylene radical, M is a cation selected from the group consisting of ammonium, morpholine, sodium, barium, and calcium and $x$ is 1 or 2 i.e., the same as the valence of M. Examples of this class of compounds are ammonium dodecyl benzene sulfonate, morpholine dodecyl benzene sulfonate, sodium dodecyl benzene sulfonate, barium dodecyl benzene sulfonate, and calcium dodecyl benzene sulfonate. If desired, mixtures of these anionic materials may be used.

The second component which is the nonionic component of our emulsifier system is itself a novel composition of matter. It may be described as an aliphatic diester of unsaturated carboxylic acids and the condensation product of glycerine and from about 15 to about 27 moles of ethylene oxide. By unsaturated carboxylic acids we mean oleic, linoleic, linolenic and abietic acids and mixtures thereof e.g., soybean fatty acids, commercial oleic acid, linseed fatty acids and crude and refined tall oils which tall oils may contain from 55% to less than 2% e.g., 1% of rosin by weight of the total. This nonionic component may be prepared by either of two procedures. In the first procedure, glycerine (about one mole) and ethylene oxide (e.g., about 25 moles) are condensed in the presence of a condensation catalyst which may be dry sodium hydroxide, dry potassium hydroxide, or alkali metal salts of weak acids, e.g., sodium carbonate, potassium carbonate and sodium acetate. The catalyst is present in an amount of from 0.05 to 0.5 part by weight based upon the weight of glycerine. The condensation is carried out at a temperature of between about 130° to 140° C. for 4 to 5 hours. The resulting product which is a glycerine-ethylene oxide condensate may be described as clear, light amber, water-soluble liquid. Thereafter, this condensation product is esterified with one of the aforesaid acids or the mixtures thereof. The proportions are from about 1.3 to 2.15 parts by weight of the glycerine-ethylene oxide condensate per one part by weight of said acid. The glycerine-ethylene oxide condensate contains from about 15 to 27 moles of ethylene oxide. This esterification reaction is carried out at temperatures of from 260° to 300° C. and for a time extending about from 2 to 4 hours. The product may be described as clear, light amber, water-soluble liquid.

Alternatively, one mole of glycerine may be condensed with six moles of ethylene oxide and thereafter with one of the aforesaid acids or mixtures thereof. Usually from about 1.6 to 1.8 parts of said acids are condensed with the glycerine-ethylene oxide condensate. Finally, the diester of the acids and the condensate of glycerine with 6 moles of ethylene oxide is condensed with the remainder of the ethylene oxide, i.e., from about 9 to 19 moles. The reaction conditions, i.e., catalysts, temperatures and periods of heating for the condensation and esterification reactions are approximately the same as in the preceding preparation. However, as Example II demonstrates, the two condensation reactions may be completed in less time i.e., 2 and 3 to 4 hours respectively and the second condensation may be carried out at temperatures up to 200° C.

It must be understood that the emulsifier system of the present invention is a combination of two components. We have found that if toxicant concentrates are prepared with only one of our components, and aqueous emulsions prepared therefrom, no useful emulsion is obtained. Instead, coarse emulsions are obtained which have large particle size and cream excessively or oil out in short periods of time e.g., 30 minutes to one hour. Hence, we believe that the unexpected success of our emulsifier system is due to a synergistic effect i.e., an unexplained coaction between the two components.

The proportions of our emulsifier system may be varied somewhat. Thus, there may be from about 35 to 55 parts by weight of the anionic component per 65 to 45 parts by weight of the nonionic component. Preferably a 45 to 55 parts by weight ratio is used. The two components are blended together by simple mixing.

To form the toxicant concentrate, a toxicant, the emulsifier system and a hydrocarbon solvent are blended together in the following proportions by weight: toxicant, 20% to 90%, emulsifier system 3% to 10%, solvent 10% to 50%. The hydrocarbon solvent is preferably of the alkylated aromatic type, e.g., toluene, xylene, ethyl benzene, monomethyl naphthalenes, dimethyl naphthalenes, trimethyl naphthalenes, ethyl naphthalenes, kerosene and pine oil. A number of these alkylated aromatic solvents are commercially available under the following commercial designations: Velsicol AR-50 (Velsicol Corp., Chicago, Ill.), PD 544-C (Socony Vacuum Oil Co.), Sun 1547 (Sun Oil Co.), Shell E-407 (Shell Oil Co), Solvesso 100 (Standard Oil Co. of N.J.). These commercial solvents are essentially mixtures of alkylated aromatic hydrocarbons of the type listed above. The toxicant may be selected from any of the synthetic organic toxicants that are available. The toxicants referred to previously herein may be successfully used in our invention; however, this list is not intended to be inclusive of all toxicants that may be used herein. The concentrates may be prepared in any conventional manner, e.g., the toxicant is dissolved in the solvent with stirring, and thereafter the emulsifier system is added also with stirring. To use the concentrate, it is diluted in water so that there is approximately 5% by weight of the concentrate in the final mixture. The pH of the aqueous solution is usually between about 6.1 to 7.0. This is achieved by deliberately adjusting the pH of the anionic component during its preparation to about 6.5 to 7.0. When this component is in turn blended with the nonionic component a pH between about 6.1 to 7.0 will naturally result when dispersed in water.

When dilute aqueous toxicant emulsions are prepared with our novel emulsifier system, a superior product is obtained. These dilute toxicant emulsions are characterized by extreme stability over a period of time. Moreover, a good bluish emulsion is obtained in both hard and soft waters of from 50 to 300 p.p.m. hardness. Should small amounts of cream form, simple mixing will suffice to redisperse it.

The following examples illustrate the invention in its preferred forms and are not to be construed in a limiting sense. All parts indicated in the examples are parts by weight.

The first three examples describe the preparation of our novel nonionic component.

*Example I*

7.70 parts of glycerine containing 0.02 part of dry sodium hydroxide as catalyst were placed in a closed vessel. The vessel was then purged with nitrogen and the charge heated to 130° C. While maintaining that temperature, 92.28 parts of ethylene oxide were pumped in at a rate equal to that with which it reacted with the charge material. This required 4 to 5 hours. The product, a clear, light amber, water-soluble liquid, was then collected.

67.9 parts of the above condensation product were mixed with 34.4 parts of refined tall oil containing 30 to 35% by weight of rosin. This mixture was refluxed with stirring for two hours at 260 to 300° C. Additional heating was carried out until the acid value was less than 3. The reaction mixture was cooled down and the product collected. It was a clear, light amber, water-soluble liquid.

*Example II*

25.8 parts of glycerine containing 0.26 part of dry potassium hydroxide were placed in a closed vessel which was subsequently purged with nitrogen. Then 74.2 parts of ethylene oxide were pumped in and reacted with the glycerine at 130° C. for 2 hours. The resulting product was recovered and was a clear, light amber, water-soluble liquid.

39.1 parts of the above condensation product were mixed with 66.4 parts of refined tall oil containing 4 to 5% by weight of rosin and refluxed at 260° C. for 2 to 4 hours until the acid value had dropped to less than 2.

Into a closed vessel was placed 54.65 parts of the product described in the preceding paragraph along with 0.1% by weight thereof of dry potassium hydroxide as a catalyst. The vessel was purged with nitrogen and the charge heated to 190° to 200° C. While maintaining that temperature, 45.25 parts of ethylene oxide were pumped in at a rate equal to that with which it reacted with the charge material. This required 3 to 4 hours. The product, a clear, light amber, water-soluble liquid was then collected.

*Example III*

7.70 parts of glycerine containing 0.02 part of dry sodium hydroxide, as catalyst, were placed in a closed vessel. The vessel was then purged with nitrogen and the charge heated to 130° C. While maintaining that temperature, 92.28 parts of ethylene oxide were pumped in at a rate equal to that with which it reacted with the charge material. This required 4 to 5 hours. The product, a clear, light amber, water-soluble liquid, was then collected.

64.4 parts of the above condensation product were mixed with 37.7 parts of crude tall oil containing about 40 to 55% by weight of rosin. This mixture was refluxed with stirring for two hours at 260° to 300° C. Additional heating was carried out until the acid value was less than 3. The reaction mixture was then cooled down and the product collected. It was found to be a clear, light amber, water-soluble liquid.

The remaining examples illustrate various toxicant concentrates and emulsions prepared with our novel emulsifier system, as well as additional embodiments of our nonionic component.

*Example IV*

The following emulsifier system was prepared by simple mixing:

| | Parts |
|---|---|
| Calcium dodecyl benzene sulfonate (75% by weight solids) | 45.0 |
| The product of Example I | 55.0 | and employed in the following concentrate also prepared by simple mixing:

| | Parts |
|---|---|
| Toxaphene | 61.0 |
| Kerosene | 35.0 |
| Preceding emulsifier system | 4.0 |

The resulting mixture represents a self-emulsifying toxicant concentrate.

Portions of the above concentrate were diluted with water to form 5% (by weight) emulsions. The water employed for dilution comprised both hard (240 p.p.m.) water and soft (40 p.p.m.) water. The hardness of both the hard and the soft waters was due to calcium chloride and magnesium chloride made up in the ratio specified in Navy Specification 51–1–19. This specification gives a hardness of 292 p.p.m. calculated as calcium carbonate. The hardnesses used in our testing maintained the $CaCl_2/MgCl_2$ ratio of Navy Specification 51–1–19 but raised or lowered the total hardness proportionately to achieve the hardnesses indicated in our examples. The 5% emulsions which were excellent bluish emulsions showed little or no cream after four hours standing. The slight cream which did separate was readily dispersed on simple mixing.

*Example V*

The following emulsifier system was prepared by simple mixing:

| | Parts |
|---|---|
| Ammonium dodecyl benzene sulfonate (75% by weight active ingredients in isobutanol) | 50.0 |
| The product of Example I | 50.0 | and employed in the following concentrate:

| | Parts |
|---|---|
| Toxaphene | 61.0 |
| Kerosene | 35.0 |
| Preceding emulsifier system | 4.0 |

Emulsions containing 5% by weight of the above concentrate were prepared with both soft (40 p.p.m.) and hard (240 p.p.m.) water. After 4 hours, 2 cc. of cream separated in both samples and after 24 hours, 5 cc. of cream separated.

*Example VI*

The following concentrate was prepared by simple mixing:

| | Parts |
|---|---|
| Butoxy ethoxypropyl ester of 2,4D acid | 80.0 |
| Kerosene | 15.0 |
| Emulsifier system of Example V | 5.0 |

Emulsions containing 10% by weight of the above concentrate were prepared with hard (240 p.p.m.) water and soft (40 p.p.m.) water. Upon standing, 2 cc. of cream were observed after one hour and 10 cc. of cream after 24 hours.

*Example VII*

The following concentrate was prepared:

| | Parts |
|---|---|
| Chlordane | 61.0 |
| Deodorized kerosene | 35.0 |
| Emulsifier system of Example IV | 4.0 |

Emulsions containing 5% by weight of the above concentrate were prepared with waters of 50 and 350 p.p.m. hardness. The resulting emulsions were characterized by an excellent bluish opalescence and upon standing for 24 hours, no oil or cream separated.

*Example VIII*

The following concentrate was prepared:

| | Parts |
|---|---|
| Heptachlor | 23.5 |
| Socal No. 2 (highly aromatic solvent of Standard Oil Co. of Southern California) | 71.5 |
| Emulsifier system of Example IV | 5.0 |

The above concentrate was used to prepare 5% emulsions in water of 150 and 400 p.p.m. hardness. The emulsions were characterized by an excellent bluish opalescence and neither cream nor oil was formed after standing for 24 hours.

*Example IX*

The following concentrate was prepared:

| | Parts |
|---|---|
| Malathion | 50.0 |
| Socal No. 2 | 42.5 |
| Emulsifier system of Example IV | 7.5 |

The above concentrate was used to prepare a 5% emulsion in water of 400 p.p.m. hardness which upon standing showed 2 cc. of cream in one hour and 6 cc. of cream in 24 hours.

*Example X*

The following emulsifier system was prepared by simple mixing:

| | Parts |
|---|---|
| Sodium dodecyl benzene sulfonate, 100% active | 50.0 |
| The product of Example I | 50.0 | and employed in the following concentrate:

| | Parts |
|---|---|
| Toxaphene | 58.5 |
| Kerosene | 33.5 |
| Preceding emulsifier system | 8.0 |

Emulsions containing 5% by weight of the above concentrate were prepared with water of 500 p.p.m. hardness. After standing for 4 hours, 2 cc. of cream were observed.

In order to demonstrate the superiority of our toxicant emulsions containing our novel nonionic component, the following data were obtained. First two emulsifier systems were prepared. The first emulsifier system was selected from the prior art and was a mixture of calcium dodecyl benzene sulfonate and, as the nonionic component, a condensate which is a tall oil fatty acid monoester of polyoxyethylene glycol, the glycol portion of the molecule having an average molecular weight of 600. The second emulsifier system was a mixture of calcium dodecyl benzene sulfonate and, as the nonionic component, the tall oil ethylene oxide condensate of Example I. The tall oil used in the preparation of the nonionic components of both the prior art and in our novel component contained 30% to 35% by weight of rosin. The hydrophobic-hydrophilic balance was about the same for both nonionic materials, i.e., the percent by weights of the hydrophobic and hydrophilic portions of the two materials were about the same. A number of emulsion concentrates were prepared containing various ratios of the anionic and nonionic components in the emulsifier system.

These concentrates contained the following ingredients:

| | Parts by weight |
|---|---|
| Toxaphene | 61 |
| Kerosene | 35 |
| Emulsifier system | 4 |

The concentrates were then used to prepare aqueous emulsions containing 5% by weight of the concentrate. In this manner, the optimum weight ratio of anionic component to nonionic component in the emulsion was determined for each of the two systems. For the system selected from the prior art, a ratio of anionic to nonionic components of 35:65 parts by weight was found to be the most satisfactory while a ratio of anionic to nonionic components of 45:55 parts by weight was found to be the most satisfactory for our system. Thereafter, keeping the total quantity of emulsifier in the aqueous dispersion constant, the quantities of each component of the emulsifier system were varied in small increments above and below the previously determined optimum weight ratios.

The stabilities of the resulting dispersions are shown in the following table, i.e., their physical characteristics were observed after the indicated periods of time. The results are shown for both soft (40 p.p.m.) and hard (240 p.p.m.) waters. These dispersions contain 5% by weight of emulsion concentrate having the composition as indicated in the preceding paragraph.

| Wt. ratio of anionic component/nonionic component of prior art | | | | | | Time, Hours | Wt. ratio of anionic component/nonionic component of this invention | | | | | |
|---|---|---|---|---|---|---|---|---|---|---|---|---|
| 30/70 | | 35/65 | | 40/60 | | | 40/60 | | 45/55 | | 50/50 | |
| P.p.m. Hardness | | P.p.m. Hardness | | P.p.m. Hardness | | | P.p.m. Hardness | | P.p.m. Hardness | | P.p.m. Hardness | |
| 40 | 240 | 40 | 240 | 40 | 240 | | 40 | 240 | 40 | 240 | 40 | 240 |
| 5 | 5 | S | S | S | S | ½ | 1 | S | S | S | S | S |
| 6 | 6 | 2 | S | S | S | 1 | 2 | S | S | S | S | 1 |
| 7 | 7 | 3 | S | 2 | 0.5 | 2 | 2 | S | S | S | S | 2 |
| 8 | 8 | 4 | S | 3 | 1 | 4 | 3 | S | S | S | S | 2 |
| 10 | 10 | 9 | S | Oil | Oil | 24 | 5 | 1 | S | 3 | S | 6 |

Nos. represent cc. of white cream; S represents "stable emulsion."

As the preceding data indicate, our emulsifier systems are superior to those of the prior art. They allow for a wider range for the admixture of the anionic and nonionic components without formation of oil and with a minimum formation of cream. This allows for a greater versatility i.e., our emulsifier system may be used with a wide range of toxicants, with various degrees of hard and soft water and in varying amounts.

*Example XI*

12.20 parts of glycerine containing 0.03 part of dry sodium hydroxide as catalyst were placed in a closed vessel. The vessel was then purged with nitrogen and the charge heated to 130° C. While maintaining that temperature, 87.7 parts of ethylene oxide were pumped in at a rate equal to that with which it reacted with the charge material. This required approximately 4 to 5 hours. In this manner there was obtained a condensate of glycerine with 15 moles of ethylene dioxide.

58.1 parts of the above condensation product were mixed with 49.0 parts of refined tall oil containing about 3% to 4% by weight of rosin. This mixture was refluxed with stirring for 2 hours at 260° to 300° C. Additional heating was carried out until the acid value was less than 3. The reaction mixture was cooled down and the product collected. It was a dark, amber liquid and dispersible in water.

*Example XII*

A glycerine-ethylene oxide condensate containing 1 mole of glycerine condensed with 25 moles of ethylene oxide was prepared as indicated in Example I, first paragraph.

69.3 parts of the above condensation product were mixed with 32.7 parts of commercial oleic acid which contained 8% to 10% by weight of saturated fatty acids and which had an iodine value of 85 to 95. This mixture was refluxed with stirring for approximately 2 hours at 260° to 300° C. Additional heating was carried out until the acid value was less than 3. Thereafter the reaction mixture was cooled down and 100 parts of product collected.

The following emulsifier system was prepared by simple mixing:

| | Parts |
|---|---|
| Calcium dodecyl benzene sulfonate | 50.0 |
| The above diester of oleic acid and glycerine ethylene oxide condensate | 50.0 | and employed in the following concentrate also prepared by simple mixing:

| | Parts |
|---|---|
| Toxaphene | 61.0 |
| Kerosene | 35.0 |
| Preceding emulsifier system | 4.0 |

Portions of the above concentrate were diluted with water to form 5% by weight emulsions in both soft (40 p.p.m.) water and hard (240 p.p.m.) water. The emulsion employing soft water was stable for 4 hours i.e., neither cream nor oil was formed within this period. In the hard water emulsion, 3 cc. of cream separated to the bottom in 4 hours.

*Example XIII*

A glycerine-ethylene oxide condensate containing 1 mole of glycerine condensed with 25 moles of ethylene oxide was prepared as indicated in Example I, first paragraph.

68.3 parts of the above condensation product were mixed with 33.7 parts of Acintol Fatty Acid No. 1 of Arizona Chemical Co. This product is a refined tall oil containing about 4% rosin. The resulting mixture was refluxed with stirring for 2 hours at 260° to 300° C. Additional heating was carried out until the acid value was less than 3. The reaction mixture was cooled down and 100 parts of product collected.

The following emulsifier system was prepared by simple mixing:

| | Parts |
|---|---|
| Calcium dodecyl benzene sulfonate | 50.0 |
| The above diester of refined tall oil and glycerine-ethylene oxide condensate | 50.0 | and employed in the following concentrate also prepared by simple mixing:

| | Parts |
|---|---|
| Toxaphene | 61.0 |
| Kerosene | 35.0 |
| Preceding emulsifier system | 4.0 |

This concentrate produced excellent 5% by weight aqueous emulsions in both 40 p.p.m. and 240 p.p.m. waters. These emulsions were stable for 24 hours and demonstrated no separation of either cream or oil in that time.

*Example XIV*

A glycerine-ethylene oxide condensate containing 1 mole of glycerine condensed with 25 moles of ethylene oxide was prepared as indicated in Example I, first paragraph.

68.3 parts of the above condensation product were mixed with 33.7 parts of soybean fatty acids having a saturated fatty acid content of 10 to 25 percent by weight and an iodine value of 100 to 125. This mixture was refluxed with stirring for about 2 hours at 260° to 300° C. Additional heating was carried out until the acid value was less than 3. The reaction mixture was cooled down and 100 parts of the product collected.

The following emulsifier system was prepared by simple mixing:

| | Parts |
|---|---|
| Calcium dodecyl benzene sulfonate | 50.0 |
| The diester of soybean fatty acids and glycerine-ethylene oxide condensate | 50.0 | and employed in the following concentrate also prepared by simple mixing:

| | Parts |
|---|---|
| Toxaphene | 61.0 |
| Kerosene | 35.0 |
| Preceding emulsifier system | 4.0 |

This concentrate when used to prepare 5% by weight aqueous emulsions with both 40 p.p.m. and 240 p.p.m. waters gave excellent emulsions i.e., neither cream nor oil separated in 24 hours.

*Example XV*

A glycerine-ethylene oxide condensate containing 1 mole of glycerine condensed with 25 moles of ethylene oxide was prepared as indicated in Example I, first paragraph.

67.9 parts of the above condensation product were mixed with 32.1 parts of linseed fatty acids (Archer Daniels Midland water white grade having an iodine value of 180 and an acid value of 197 to 204). This mixture was refluxed with stirring for 2 hours at 260° to 300° C. Additional heating was carried out until the acid value was less than 3. Thereafter the reaction mixture was cooled down and a yield of 100 grams of product collected.

The following emulsifier system was prepared by simple mixing:

| | Parts |
|---|---|
| Calcium dodecyl benzene sulfonate | 50.0 |
| The above diester of linseed fatty acids and glycerine-ethylene oxide condensate | 50.0 | and employed in the following concentrate also prepared by simple mixing:

| | Parts |
|---|---|
| Toxaphene | 61.0 |
| Kerosene | 35.0 |
| Preceding emulsifier system | 4.0 |

Emulsions containing 5% by weight of the above concentrate were prepared using 40 p.p.m. and 240 p.p.m. waters. These emulsions showed no cream or oil separation in 24 hours.

The calcium dodecyl benzene sulfonate used in Examples XII to XV was 75% by weight solids.

This application is a divisional application of Serial No. 696,969, Altscher et al., filed November 18, 1957, now Patent No. 3,071,550.

Having thus described our invention what we claim as new and desire to secure by Letters Patent is:

1. An emulsifiable toxicant concentrate which upon the addition thereof to soft as well as hard waters forms a fine dispersion in said water, said concentrate comprising from about 20 to 90% by weight of at least one organic solvent soluble, water-insoluble toxicant, from 10 to 50% by weight of an organic solvent for said toxicant and from about 3 to 10% of an emulsifier mixture consisting essentially of (1) at least one anionic component having the formula $[R-Ar-SO_3]_xM$ wherein R is an alkyl group having from 8 to 18 carbon atoms in the chain, Ar is a phenylene radical, M is a cation selected from the group consisting of ammonium, morpholine, sodium, barium and calcium and $x$ is a whole number selected from the group consisting of the numbers 1 and 2, and (2) a nonionic component which is an aliphatic diester of an unsaturated carboxylic acid selected from the group consisting of oleic, linoleic, linolenic and abietic acids and mixtures thereof and a condensate of glycerine and from 15 to about 27 moles of ethylene oxide, said ingredients (1) and (2) being present in an amount of from about 35 to 55 parts by weight of said anionic component per 65 to 45 parts by weight of said nonionic component.

2. The emulsifiable toxicant concentrate of claim 1 in which said anionic component is selected from the group consisting of ammonium dodecyl benzene sulfonate, morpholine dodecyl benzene sulfonate, sodium dodecyl benzene sulfonate, barium dodecyl benzene sulfonate, calcium dodecyl benzene sulfonate, and mixtures thereof.

3. An emulsifiable toxicant concentrate which upon the addition thereof to soft as well as hard waters forms a fine dispersion in said water, said concentrate comprising from about 20% to 90% by weight of at least one organic solvent soluble, water-insoluble toxicant, from 10% to 50% by weight of an organic solvent for said toxicant and from about 3% to 10% of an emulsifier mixture consisting essentially of (1) at least one anionic component selected from the group consisting of ammonium dodecyl benzene sulfonate, morpholine dodecyl benzene sulfonate, sodium dodecyl benzene sulfonate, barium dodecyl benzene sulfonate, calcium dodecyl benzene sulfonate, and mixtures thereof, and (2) a nonionic component which is an aliphatic diester of an unsaturated carboxylic acid selected from the group consisting of oleic, linoleic, linolenic and abietic acids and mixtures thereof and a condensate of glycerine and about 25 moles of ethylene oxide, said ingredients (1) and (2) being present in an amount of from about 35 to 55 parts by weight of said anionic component per 65 to 45 parts by weight of said nonionic component.

4. The emulsifiable toxicant concentrate of claim 3 in which said mixture is tall oil containing from about 30% to 35% by weight thereof of rosin.

5. The emulsifiable toxicant concentrate of claim 4 in which said anionic component is calcium dodecyl benzene sulfonate and said anionic and nonionic components are present in a ratio of 45:55 parts by weight.

6. The emulsifiable toxicant concentrate of claim 5 in which said toxicant, said solvent and said emulsifier system are present in approximate amounts of 61, 35 and 4 parts by weight respectively.

7. The emulsifiable toxicant concentrate of claim 6 in which said toxicant is toxaphene and said solvent is kerosene.

8. The emulsifiable toxicant concentrate of claim 6 in which said toxicant is chlordane and said solvent is kerosene.

9. The emulsifiable toxicant concentrate of claim 3 in which said nonionic component is an aliphatic diester of soybean fatty acids and a condensate of glycerine and about 25 moles of ethylene oxide.

10. The emulsifiable toxicant concentrate of claim 3 in which said nonionic component is an aliphatic diester of linseed fatty acids and a condensate of glycerine and about 25 moles of ethylene oxide.

References Cited in the file of this patent

UNITED STATES PATENTS

| 1,959,930 | Schmidt | May 22, 1934 |
| 2,696,453 | Sanders | Dec. 7, 1954 |
| 2,945,818 | Costone et al. | July 19, 1960 |